US010001913B2

United States Patent
von Muhlen et al.

(10) Patent No.: US 10,001,913 B2
(45) Date of Patent: Jun. 19, 2018

(54) SHARED WORKSPACES WITH SELECTIVE CONTENT ITEM SYNCHRONIZATION

(71) Applicant: Dropbox, Inc., San Francisco, CA (US)

(72) Inventors: Marcio von Muhlen, San Francisco, CA (US); George Milton Underwood, IV, Palo Alto, CA (US); Anthony DeVincenzi, San Francisco, CA (US); Nils Bunger, Palo Alto, CA (US); Colin Dunn, San Francisco, CA (US); Adam Polselli, San Francisco, CA (US); Sam Jau, San Francisco, CA (US); Nathan Borror, Palo Alto, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days. days.

(21) Appl. No.: 15/010,220

(22) Filed: Jan. 29, 2016

(65) Prior Publication Data

US 2016/0291856 A1    Oct. 6, 2016

Related U.S. Application Data

(60) Provisional application No. 62/141,577, filed on Apr. 1, 2015.

(51) Int. Cl.
*G06F 3/0484* (2013.01)
*G06F 3/0481* (2013.01)
(Continued)

(52) U.S. Cl.
CPC ........ *G06F 3/04847* (2013.01); *G06F 3/0482* (2013.01); *G06F 3/04817* (2013.01);
(Continued)

(58) Field of Classification Search
CPC ..... H04L 67/04; H04L 67/1097; H04L 67/10; H04L 67/06; H04L 65/1069;
(Continued)

(56) References Cited

U.S. PATENT DOCUMENTS 6,473,426 B1    10/2002  Killian
6,834,284 B2    12/2004  Acker et al.
(Continued)

FOREIGN PATENT DOCUMENTS

EP    1 517 260 A2    3/2005

OTHER PUBLICATIONS

Hendrickson, Mark. Dropbox: The Online Storage Solution We've Been Waiting For? Posted on Mar. 11, 2008 at TechCrunch. Retrieved on [Oct. 17, 2016]. 6 pages.*
(Continued)

*Primary Examiner* — Amy M Levy
(74) *Attorney, Agent, or Firm* — Hickman Palermo Becker Bingham LLP; Adam C. Stone

(57) ABSTRACT

Shared workspaces with selective content item synchronization. In one embodiment, for example, a method performed at a personal computing device comprises: displaying an actionable shared workspace launcher icon for a shared workspace accessible by a user account held with a content management system; downloading metadata pertaining to the shared workspace from the content management system; downloading one or more content item blocks for a particular content item belonging to the shared workspace from a content item server of the content management system; storing the one or more content item blocks at the personal computing device; and responsive to an activation of an actionable file system icon corresponding to the particular content item, updating display of the corresponding actionable file system icon for the particular content item
(Continued)

to indicate that the particular content item is currently configured for offline access.

16 Claims, 7 Drawing Sheets

(51) Int. Cl.
*G06F 3/0482* (2013.01)
*H04L 29/08* (2006.01)
*H04L 29/06* (2006.01)

(52) U.S. Cl.
CPC ...... *G06F 3/04842* (2013.01); *H04L 65/1069* (2013.01); *H04L 67/04* (2013.01); *H04L 67/06* (2013.01); *H04L 67/10* (2013.01); *H04L 67/1097* (2013.01)

(58) Field of Classification Search
CPC ............. G06F 3/04847; G06F 3/04817; G06F 3/0482; G06F 3/04841
See application file for complete search history.

(56) References Cited

U.S. PATENT DOCUMENTS

| | | | |
|---|---|---|---|
| 7,340,723 B2 | 3/2008 | Antonov et al. | |
| 7,401,089 B2 | 7/2008 | Benton et al. | |
| 7,689,510 B2* | 3/2010 | Lamkin | G06F 17/30041 705/51 |
| 7,890,646 B2* | 2/2011 | Khosravy | H04L 67/1095 707/610 |
| 7,925,966 B2 | 4/2011 | Kaler et al. | |
| 7,937,686 B2 | 5/2011 | Sorensen et al. | |
| 8,015,491 B2* | 9/2011 | Shaver | G06F 17/3089 715/716 |
| 8,214,747 B1* | 7/2012 | Yankovich | G06F 9/4451 715/751 |
| 8,307,028 B2 | 11/2012 | Kakivaya et al. | |
| 8,312,046 B1 | 11/2012 | Eisler et al. | |
| 8,341,532 B2* | 12/2012 | Ryan | G06Q 10/10 715/751 |
| 8,429,540 B1* | 4/2013 | Yankovich | G06F 9/4451 709/204 |
| 8,458,299 B2 | 6/2013 | Lin et al. | |
| 8,484,260 B2* | 7/2013 | Caso | G06F 17/30094 707/827 |
| 8,713,106 B2* | 4/2014 | Spataro | G06Q 10/10 709/205 |
| 8,819,587 B1* | 8/2014 | Shrum | G06F 3/0481 715/810 |
| 8,892,679 B1* | 11/2014 | Destagnol | G06Q 10/10 709/203 |
| 8,930,412 B2* | 1/2015 | Nelson | G06F 17/3089 705/7.25 |
| 9,185,164 B1* | 11/2015 | Newhouse | G06F 17/30138 |
| 2002/0174180 A1* | 11/2002 | Brown | G06F 17/30176 709/203 |
| 2004/0068523 A1* | 4/2004 | Keith, Jr. | G06F 17/30176 |
| 2005/0262371 A1* | 11/2005 | Luke | G06F 17/30174 713/400 |
| 2006/0041844 A1* | 2/2006 | Homiller | H04L 12/581 715/734 |
| 2007/0100829 A1* | 5/2007 | Allen | G06F 17/3089 |
| 2007/0214497 A1 | 9/2007 | Montgomery et al. | |
| 2007/0220220 A1* | 9/2007 | Ziv | G06F 3/0605 711/159 |
| 2008/0046218 A1* | 2/2008 | Dontcheva | G06F 11/32 702/186 |
| 2008/0141250 A1* | 6/2008 | Dorn | G06F 9/52 718/100 |
| 2008/0208870 A1* | 8/2008 | Tsang | G06F 17/30165 |
| 2009/0055464 A1* | 2/2009 | Multer | H04L 67/1095 709/201 |
| 2009/0192845 A1* | 7/2009 | Gudipaty | G06Q 10/10 705/7.19 |
| 2009/0222741 A1* | 9/2009 | Shaw | G06Q 10/109 715/753 |
| 2009/0327405 A1* | 12/2009 | FitzGerald | G06Q 10/10 709/203 |
| 2010/0241711 A1* | 9/2010 | Ansari | G06Q 30/04 709/205 |
| 2011/0153759 A1* | 6/2011 | Rathod | G06F 17/30867 709/206 |
| 2011/0154431 A1 | 6/2011 | Walsh | |
| 2012/0221520 A1* | 8/2012 | Garrett | G06F 17/3089 707/622 |
| 2013/0013560 A1* | 1/2013 | Goldberg | G06F 17/30174 707/634 |
| 2013/0014023 A1* | 1/2013 | Lee | G06Q 10/103 715/751 |
| 2013/0080919 A1* | 3/2013 | Kiang | H04L 67/327 715/753 |
| 2013/0138608 A1* | 5/2013 | Smith | G06F 17/30575 707/610 |
| 2013/0160072 A1* | 6/2013 | Reus | G06F 21/604 726/1 |
| 2013/0191339 A1* | 7/2013 | Haden | G06F 17/3007 707/638 |
| 2013/0198600 A1* | 8/2013 | Lockhart | G06F 17/241 715/230 |
| 2013/0212112 A1* | 8/2013 | Blom | G06F 17/30115 707/741 |
| 2013/0212484 A1* | 8/2013 | Joshi | G06F 9/541 715/740 |
| 2013/0212485 A1* | 8/2013 | Yankovich | G06F 9/4451 715/741 |
| 2013/0227083 A1* | 8/2013 | Kim | H04L 67/32 709/219 |
| 2013/0268480 A1* | 10/2013 | Dorman | G06F 17/30575 707/608 |
| 2013/0275398 A1* | 10/2013 | Dorman | G06F 17/30126 707/693 |
| 2013/0275509 A1* | 10/2013 | Micucci | H04L 67/02 709/204 |
| 2014/0059642 A1* | 2/2014 | Deasy | G06F 21/53 726/1 |
| 2014/0172783 A1* | 6/2014 | Suzuki | G06F 8/63 707/609 |
| 2014/0181697 A1* | 6/2014 | Kirigin | H04L 12/1831 715/758 |
| 2014/0208220 A1* | 7/2014 | Watal | G06Q 10/101 715/738 |
| 2014/0215551 A1* | 7/2014 | Allain | H04L 63/104 726/1 |
| 2014/0215568 A1* | 7/2014 | Kirigin | G06F 21/00 726/4 |
| 2014/0229839 A1* | 8/2014 | Lynch | G06F 9/44505 715/736 |
| 2014/0280602 A1* | 9/2014 | Quatrano | H04W 4/08 709/205 |
| 2014/0304618 A1* | 10/2014 | Carriero | H04L 12/1818 715/753 |
| 2014/0324777 A1* | 10/2014 | Novak | G06F 17/30153 707/624 |
| 2014/0359465 A1* | 12/2014 | Litan Sever | G06F 3/04817 715/738 |
| 2014/0365432 A1* | 12/2014 | Jain | G06F 17/30194 707/610 |
| 2015/0006146 A1 | 1/2015 | Wilkes et al. | |
| 2015/0058932 A1 | 2/2015 | Faitelson et al. | |
| 2015/0082198 A1* | 3/2015 | Destagnol | G06Q 10/10 715/753 |
| 2015/0134808 A1* | 5/2015 | Fushman | G06Q 30/02 709/224 |
| 2015/0186395 A1* | 7/2015 | Yan | G06F 17/30997 707/609 |

(56) References Cited

U.S. PATENT DOCUMENTS

2016/0050177 A1* 2/2016 Cue .................. H04L 51/34
                                                709/206
2016/0092443 A1* 3/2016 Hayes ............ G06F 17/30056
                                                726/28
2016/0292443 A1   10/2016 Muhlen

OTHER PUBLICATIONS

Lefebvre, Rob. Mastering iCloud on Your Mac: Use iClouDrive to Access Your Files Like Dropbox [OS X Tips] Posted on Mar. 28, 2013 at Cult of Mac. Retrieved on [Oct. 17, 2016]. 3 pages.*
Dropbox screenshot. Publically available Jul. 3, 2013. Retrieved from [http://www.filewin.net/Dropbox/] via Internet Archive on [Oct. 17, 2016]. 2 pages.*
European Patent Office, "Search Report" in application No. PCT/US2016/025015, dated Jun. 16, 2016, 11 pages.
European Patent Office, "Search Report" in application No. PCT/US2016/025014, dated Jul. 14, 2016, 11 pages.
European Claims in application No. PCT/US2016/025014, dated Jul. 2016, 7 pages.
European Claims in application No. PCT/US 2016/025015, dated Jun. 2016, 6 pages.
Brim, Michael, "Extreme Scale via Group File Semantics", ProQuest Dissertations Publishing, dated 2012, Dissertation/thesis No. 3508182, 202 pages.

* cited by examiner

SHARED WORKSPACES WITH SELECTIVE CONTENT ITEM SYNCHRONIZATION

PRIORITY CLAIM

This application claims the benefit of provisional application 62/141,577, filed Apr. 1, 2015, the entire contents of which is hereby incorporated by reference as if fully set forth herein, under 35 U.S.C. § 119(e).

TECHNICAL FIELD

The present application relates generally to cloud-based content management systems and, more specifically, to synchronized content management systems for storing, managing, sharing, and accessing digital content items such as, for example, digital documents and files.

BACKGROUND

Traditionally, businesses and other organizations have stored their digital content items (e.g., documents, files, and other digital information) on network file servers they owned and operated. Such file servers are typically located on-site behind a network firewall that prevents unauthorized network access to the content items stored on the file server. This arrangement works well when most or all of the network access to the file server is by computers which are also behind the network firewall such as, for example, connected to the same Local Area Network (LAN) as the file server. In some cases, network access to the file server from outside the firewall (e.g., over the Internet) is facilitated by a Virtual Private Network (VPN). The VPN, in effect, makes a computer outside the firewall appear to the file server as if it is behind the firewall.

Today, however, the workforce is more global and more mobile. This is spurred, in large part, by the wide-spread availability of broadband Internet connectivity and also the availability of relatively inexpensive, yet powerful, personal computing devices such as, for example, desktop computers, mobile phones, laptop computers, and tablet computers. The result is employees can work virtually anywhere and do not necessarily need to be physically present in the office to get their work done (e.g., they can work remotely).

To work remotely, employees often store content items locally at their personal computers (e.g., on a local hard disk) that are copied from their employer's file server so that they can work with the content items offline or otherwise while not connected by a network to the file server. This is less than ideal from the employer's perspective because the employer has less control over the locally stored content items when compared to the content items stored on the file server. This lack of control, which stems from storing local copies of the content items at the employee's personal computing device, poses risk to both the employer and the employee, for example, if the employee's personal computing device is lost, damaged, or stolen.

Recently, cloud-based content management services have become available for storing content items "in the cloud" where they are accessible on the Internet. A business may use a cloud-based content management service to "host" their content items on servers operated by the service in addition to or instead of storing content items on their own file servers. Cloud-based storage of content items can provide a number of benefits to businesses and their employees alike. Dropbox, for instance, offers the ability to synchronize and share hosted content items among multiple devices and users. This flexibility, which stems for storing content items both at end-user devices and on Dropbox servers, supports a variety of different on-site and remote working arrangements, providing convenience to employees and increased employee productivity for employers.

Notwithstanding the benefits of cloud-based content management services, current services do not provide businesses with the control they desire and in a way that does not unnecessarily hinder the productivity of the employees. Consider the following problem. Employees of a business may collectively host hundreds of gigabytes of content items or more with a cloud-based content management service. However, the employees may have personal computing devices that can store locally only tens of gigabytes of data making it infeasible to store all of the hosted content items at any one personal computing device. Thus, employees may adopt various ad-hoc solutions to get local access at their personal computing devices to the subset of content items they need. For example, a team of employees may create an account with a cloud-based content management service containing the subset of content items. The team members may then use shared credentials to access the content items using the service. The use of shared credentials by multiple employees makes it more difficult for the business to track individual employee access to the content items and also makes it more difficult for the business to control which employees have access to the content items. This has become a massive data management problem that is posing critical administrative challenges for businesses and cloud-based content management service providers.

Given the increasing amount of digital information generated by businesses, hosting of content items by businesses with cloud-based content management services can only be expected to increase. This trend is coupled with a desire of the businesses to retain a level of control over the content items they host with such services. The present invention fulfills this and other needs.

BRIEF DESCRIPTION OF THE DRAWINGS

For a better understanding of the aforementioned aspects of the invention as well as additional aspects and embodiments thereof, reference should be made to the Description of Embodiments below, in conjunction with the following drawings in which like reference numerals refer to corresponding parts throughout the figures.

DESCRIPTION OF EMBODIMENTS

The above-deficiencies and other problems associated with existing cloud-based content management services are reduced or eliminated by the disclosed cloud-based synchronized content management system providing shared workspaces and selective content item synchronization. Reference will be made to certain embodiments of the invention, examples of which are illustrated in the accompanying drawings. While the invention will be described in conjunction with the embodiments, it will be understood that it is not intended to limit the invention to these particular embodiments alone. On the contrary, the invention is intended to cover alternatives, modifications and equivalents that are within the spirit and scope of the invention.

Moreover, in the following description, numerous specific details are set forth to provide a thorough understanding of the present invention. However, it will be apparent to one of ordinary skill in the art that the invention may be practiced without these particular details. In other instances, methods, procedures, components, and networks that are well known to those of ordinary skill in the art are not described in detail to avoid obscuring aspects of the present invention.

Example Cloud Computing Environment

Figure 1:
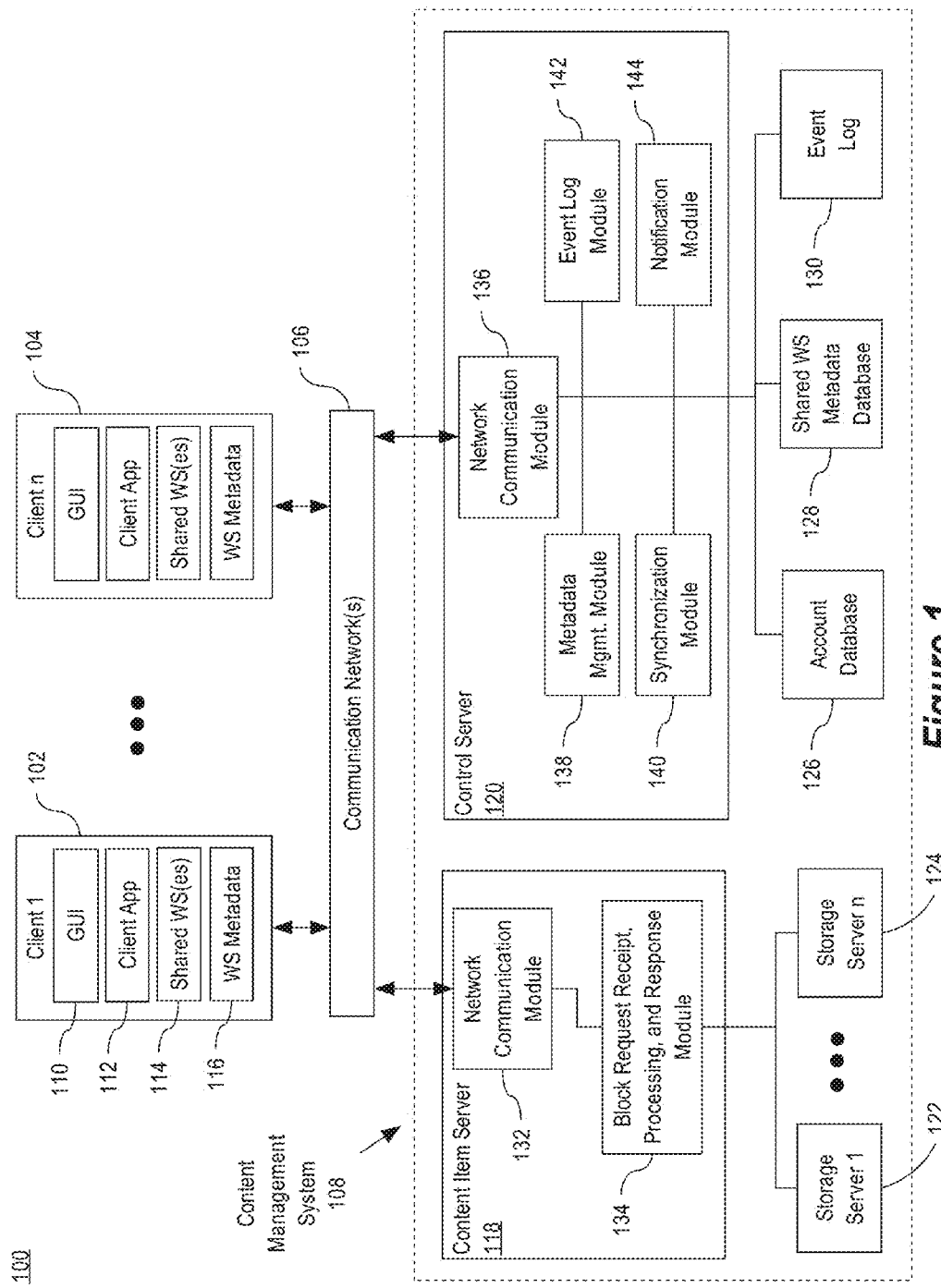
FIG. 1 is a block diagram illustrating an exemplary distributed computing environment according to an embodiment of the present invention.

FIG. 1 is a block diagram illustrating an exemplary distributed computer system 100 according to an embodiment of the invention. FIG. 1 shows various functional components that will be referred to in the detailed discussion that follows. The system 100 may include one or more clients 102-104. Client 102 can be any of a number of devices (e.g., computer, internet kiosk, personal digital assistant, cell phone, gaming device, desktop computer, laptop computer, or tablet computer) used to enable the activities described below. Client 102 includes graphical user interface (GUI) 110, client application 112, one or more shared workspaces 114, and shared workspace metadata 116 pertaining to the shared workspaces 114. Clients 102-104 are connected to a communications network 106. The communications network 106 connects the clients 102-104 to a cloud-based content management system 108 (also referred to hereinafter as "cloud system 108"). Cloud system 108 includes a content item server 118 and a control server 120 connected to the communications network 106, content item storage servers 122-124, a user account database 126, a shared workspace metadata database 128, and a user event log 130.

The cloud system 108 provides content item management services to clients 102-104 including shared workspaces and selective content item synchronization as described below. It should be appreciated that the layout of the cloud system 108 is merely exemplary and may take on any other suitable layout or configuration. The cloud system 108 may be used to manage content items, such as billions of files or documents hosted by modern cloud-based content management systems.

A content item managed by cloud system 108 may be a logical collection of digital information including, but not limited to, a digital document, file, or other logical collection of digital information. Often, a content item corresponds to a known media type such as, for example, an image (e.g., JPEG, TIFF, GIF, etc.), music (e.g., .MP3, AIFF, M4A, WAV, etc.), a movie (e.g., MOV, MP4, M4V, etc.), a word processing document (e.g., DOC, DOCX, PAGES, etc.), other document (e.g., PDF, etc.), a spreadsheet document (e.g., XLS, XLSX, NUMBERS, etc.), a presentation document (e.g., PPT, PPTX, KEY, etc.), a web page (e.g., HTM, HTMLS, etc.), or a text file (e.g., TXT, RTF, etc.). However, a content item managed by cloud system 108 is not limited to being a particular media type, and the content item may encompass any logical collection of digital information including binary data, text data, or other digital information.

Note that the cloud system 108 can be used as an Internet content management service, for managing hosted content items over the Internet or other public network and/or as an intranet content management service, for managing hosted content items over a local area network (LAN) or other private network.

The cloud system 108 may include multiple data centers, each housing a backend. The data centers may be geographically dispersed from one another, such as across the continental United States. Network requests from one of the clients 102-104 to the cloud system 108 are routed to an appropriate backend, based on a variety of possible factors including, for example, the content, nature, or type of the request and/or geographic location of the network request.

Each backend preferably includes multiple control servers, such as control server 120, and/or multiple content item servers, such as content item server 118, each coupled to a communications network 106 via a respective network communication module (e.g., 132 or 136). The communications network 106 may be the Internet, but may also be any local area network (LAN) and/or wide area network (WAN).

In some embodiments, each content item server 118 and each control server 120 is a Web server that receives network requests from the client application 112 and delivers network responses to the client application 112 via HTTP, HTTPS or similar protocol. In essence, the content item servers, such as content item server 118, are configured to store and retrieve blocks of content items stored in storage servers 122-124 as requested by the client application 112. The control servers, such as control server 120, are configured to control the content item management process in conjunction with client application 112, including providing shared workspaces 114 and selectively synchronizing content items between cloud system 108 and clients 102-104 in conjunction with the client application 112 as described below.

The content item server 118 typically includes a network communication module 132 and a block request receipt, processing, and response module 134, connected to each other. The network communications module 132 connects the content item server 118 to the communication network 106 and enables receipt of communications from the communication network 106 and the provision of communications to the communication network 106 bound for the client 102 or other destinations. The block request receipt, processing, and response module 134 is primarily responsible for receiving requests for content item blocks, processing them and returning the requested blocks to the client 102 via the network communication module 132.

The storage servers 122-124 store content item blocks. Each content item block may contain all of or a portion of a content item managed by the cloud system 108. Each content item block may be a fixed size such as, for example, 4 Megabytes (MB). Depending on the size of the content item, the content item may be stored on one or more of the storage servers 122-124 in one or more content item blocks, with the last content item block potentially having less than the fixed block size amount of data.

Each content item block in the storage servers 122-124 may be identified by a cryptographic hash (e.g., SHA-256) of the block's contents. A content item stored in the storage servers 122-124 may be uniquely identified by a list of one or more cryptographic hashes identifying the one or more content item blocks in one or more of the storage servers 122-124 containing the content item's contents. This list is referred to hereinafter as the "blocklist" of the content item.

The block request receipt, processing, and response module 134 may receive, process, and respond to at least two different types of requests from the client application 112.

A first type of request is referred to as a "store" request. A store request may contain two lists. A first list contains one or more cryptographic hashes $H_1, H_2, \ldots H_N$. A second list contains one or more corresponding blocks of data $B_1, B_2, \ldots B_N$. That is, the cryptographic hash $H_i$ ($1 \le i \le N$) in the first list is computed from the corresponding block of data $B_i$ ($1 \le i \le N$) in the second list using a cryptographic or one way hash function (e.g., SHA-256 or the like). Upon receiving a store request, for each hash $H_i$ in the first list, block $B_i$ in the second list is stored in a content item block on a storage server 122 and the content item block (or a storage address thereof) is associated with hash $H_i$ in a key-value mapping maintained by the content item server 118. One or more store requests may be issued from the client application 112 to store a new content item or update an existing content item in the storage servers 122-124.

A second type of request that the block request receipt, processing, and response module 134 may receive and process is referred to as a "retrieve" request. A retrieve request may contain a list of one or more cryptographic hashes $H_1, H_2, \ldots H_N$ identifying one or more content item blocks to retrieve from the storage servers 122-124 and send to the requesting client application 112 over communication network 106. Upon receiving a retrieve request, for each hash value $H_i$ in the request, the key-value mapping maintained by the content item server 118 is consulted with the hash value $H_i$ to identify the content item block (or the storage address thereof) for the hash $H_i$ and the contents of the content item block are sent over communication network 106 to the requesting client application 112. One or more retrieve requests may be issued from the client application 112 to retrieve a content item from the storage servers 122-124.

The control server 120 typically includes a network communications module 136, a shared workspace metadata management module 138, a synchronization module 140, an event log module 142, and a notification module 144, all interconnected. The network communications module 136 connects the control server 120 to the communication network 106 and enables receipt of communications from the communication network 106 and the provision of communications to the communication network 106 bound for the client application 112 at a client 102 or other destinations.

The shared workspace metadata management module 138 (or just "management module 138") is primarily responsible for receiving requests to view or change (i.e., add, edit, or delete) shared workspace metadata in shared workspace metadata database 128, processing the requests, and returning a response to the requesting client 102 via the communication module 136.

The synchronization module 140 is primarily responsible for periodically synchronizing content items stored in shared workspaces 114 at clients 102-104 and/or synchronizing shared workspace metadata 116 stored at clients 102-104 with content items stored in storage servers 122-124 and/or shared workspace metadata stored in shared workspace metadata database 128.

The event log module 142 collects event items reflecting user interaction with shared workspaces 114 and the content items thereof at clients 102-104 and stores the event items in event log 130.

Notification module 144 notifies client application 112 at a client 102 (e.g., via HTTP long polling) when new synchronization updates are available for content items in the shared workspace 114 and/or the shared workspace metadata 116 at the client 102.

The user account database 126 stores information about users of the cloud system 108. Each user may have a record in account database 126. In some embodiments, a record for an account in the account database 126 includes all of the following information, or a subset or a superset thereof:

Account ID—A unique identifier of the account in the account database 126;

Authentication Credentials—Information such as, for example, a username and password, which may be used to authenticate a user of the account;

Linked Devices [Device $ID_1$, Device $ID_2$, . . . Device $ID_n$]—A list of one or more unique identifiers of clients 102-104 that are linked to this account. This list may also be empty if no clients 102-104 are currently linked to the account. A client 102 may be linked to the account in a variety of different ways. In one way, a user may link the client 102 to the account by successfully installing the client application 112 on the client 102 and successfully authenticating against the account from the client 102. For example, the user may successfully authenticate against the account by providing the Authentication Credentials of the account record to the control server 120 from the client 102. In some instances, the client 102 is not linked to the account until after both the user has successfully authenticated against the account from the client 102 and the client application 112 has successfully communicated with the control server 120 from the client 102; and Device-Shared Workspaces {Device $ID_j$, [Shared Workspace $ID_1$, Shared Workspace $ID_2$, . . . Shared Workspace $ID_n$]}—For each client 102 (Device $ID_j$) linked to the account in [Device $ID_1$, Device $ID_2$, . . . Device $ID_N$], a list of one of more identifiers of shared workspaces 114 that the client 102 has joined. A process for joining a client 102 to a shared workspace 114 is described below. Thus, a shared workspace 114 may exist at multiple clients 102-104 including at clients 102-104 belonging to different users.

The shared workspace metadata database 128 stores information about shared workspaces 114. According to some embodiments, the shared workspace metadata database 128 includes a content item journal. Each record in the content item journal represents a content item stored in the storage servers 122-124. In some embodiments, a journal record in the content item journal includes all of the following information, or a subset or a superset thereof:

Shared Workspace ID—An identifier of a shared workspace to which the content item belongs;

Shared Workspace Path—A file system-like path to the content item in the shared workspace. A shared workspace may organize content items according to a hierarchical tree-like arrangement. The tree may have a single root and be composed of one or more nodes one of which represents the root. Each of the nodes under the root (descendants of the root), if there are any, represents either a content item folder or a content item in the shared workspace. A content item folder is a named collection of one or more content items and/or other content item folders. However, a content item folder may be empty. Because content item folders can be nested in other content item folders, the tree may have multiple levels. Leaf nodes of the tree either represent an empty content item folder or a content item. For example, the shared workspace path "/Design/icons.psd" implies the tree has at least three nodes: the root node (represented by the first forward slash in the path), a node descending directly from the root node representing a content item folder named "Design," and a node descending directly from that node representing a content item named "icons.psd";

Blocklist $[H_1, H_2, \ldots H_n]$—A list of cryptographic hashes, each identifying a content item block in the storage servers 122-124 containing data of the content item; and Journal ID—An ever-increasing value, unique at least within the shared workspace, that represents when the content item was created or last modified relative to other content items in the shared workspace.

According to some embodiments, the shared workspace metadata database 128 includes access control information for shared workspaces 114. The access control information may include a number of records. Each access control record may represent access controls on a content item folder or a content item in a shared workspace 114. In some embodiments, an access control record in the database 128 includes all of the following information, or a subset or a superset thereof:

Shared Workspace ID—An identifier of a shared workspace to which the content item or the content item folder belongs;

Shared Workspace Path—The file system-like path to the content item folder or the content item in the shared workspace; and Access Control List—A set of one or more access control items. Each access control item in the list specifies a user or a group of users and one or more permissions that apply to the user or group of users with respect to the content item or the content item folder. According to some embodiments, a given user has no permission with respect to a content item folder or a content item in a shared workspace unless there is an access control record in the database 128 granting one or more permissions to the user. According to some embodiments, the permissions that may be granted to a user or a group of users with respect to a content item folder or a content item in a content item namespace include all of the following, or a subset or a superset thereof:

Exist—The user can know about the existence of the content item folder or the content item through the folder or item's shared workspace path but cannot access the contents of the content item;

View—The user can open and access the contents of the content item folder or the content item but cannot modify the contents. Includes the Exist permission;

Modify—The user can modify the contents of the content item folder or the content item but cannot delete the content item folder or the content item. Includes the View permission; and Remove—The user can delete or remove the content item folder or the content item from the shared workspace. Includes the Modify permission.

The event log 130 stores event items. Each event item represents a user event that occurred at a client 102 with respect to a content item folder or a content item in a shared workspace 114. The event item may be generated by the client application 112 at the client 102 in response to detecting the user event. The generated event item may then be subsequently sent by the client application 112 to the control server 120 for processing by the event log module 142.

The detected user event may correspond to an action at the client 102 taken by a user on a content item folder or a content item of a shared workspace 114 at the client 102. The client application 112 may detect the user event via an application programming interface (API) offered by an operating system on the client 102. Such action may include, for example, creating, opening, modifying, or removing a content item folder in the shared workspace 114. Also with respect to a content item folder, such action may be copying or moving the content item folder from the shared workspace 114 to another location in the shared workspace 114 or to a location outside the shared workspace 114 at the client 102. Similarly, with respect to a content item in a shared workspace 114 at a client 102, an action at the client 102 by a user corresponding to an event item in event log 130 may include creating, opening, modifying, removing, copying, or moving the content item at the client 102.

In some embodiments, fewer and/or additional modules, functions, or databases are included in cloud system 108. The modules shown in FIG. 1 as being part of cloud system 108 represent functions performed in an exemplary embodiment.

Although FIG. 1 portrays discrete blocks, the figure is intended more as a functional description of some embodiments of the invention rather than a structural description of the functional elements. One of ordinary skill in the art will recognize that an actual implementation might have the functional elements grouped or split among various components. For example, the shared workspace metadata database 128 may be part of a combination synchronization 140 and notification module 144. Similarly, the journal item journal and the access control information described above as being stored in shared workspace metadata database 128 may instead be stored in separate databases. Moreover, one or more blocks in FIG. 1 may be implemented on one or more servers designed to provide the described functionality. Further, although the description herein refers to certain features implemented in the client 102 and certain features implemented in the cloud system 108, the embodiments of the invention are not limited to such distinctions. For example, features described herein as being part of the cloud system 108 could be implemented in whole or in part in the client 102, and vice versa.

In accordance with some embodiments, clients 102-104 and cloud system 108 are implemented on one or more conventional computing devices. Such a computing device may take various different forms including, but not limited to, a client computer, a server computer, a network device, a mobile computing device, a cell phone, a smart phone, a tablet computer, a laptop computer, a desktop computer, a workstation computer, a personal digital assistant, a blade server, a mainframe computer, a set-top device, a gaming console, an in-vehicle computer, or other type of computing device.

Example Basic Hardware

Figure 2:
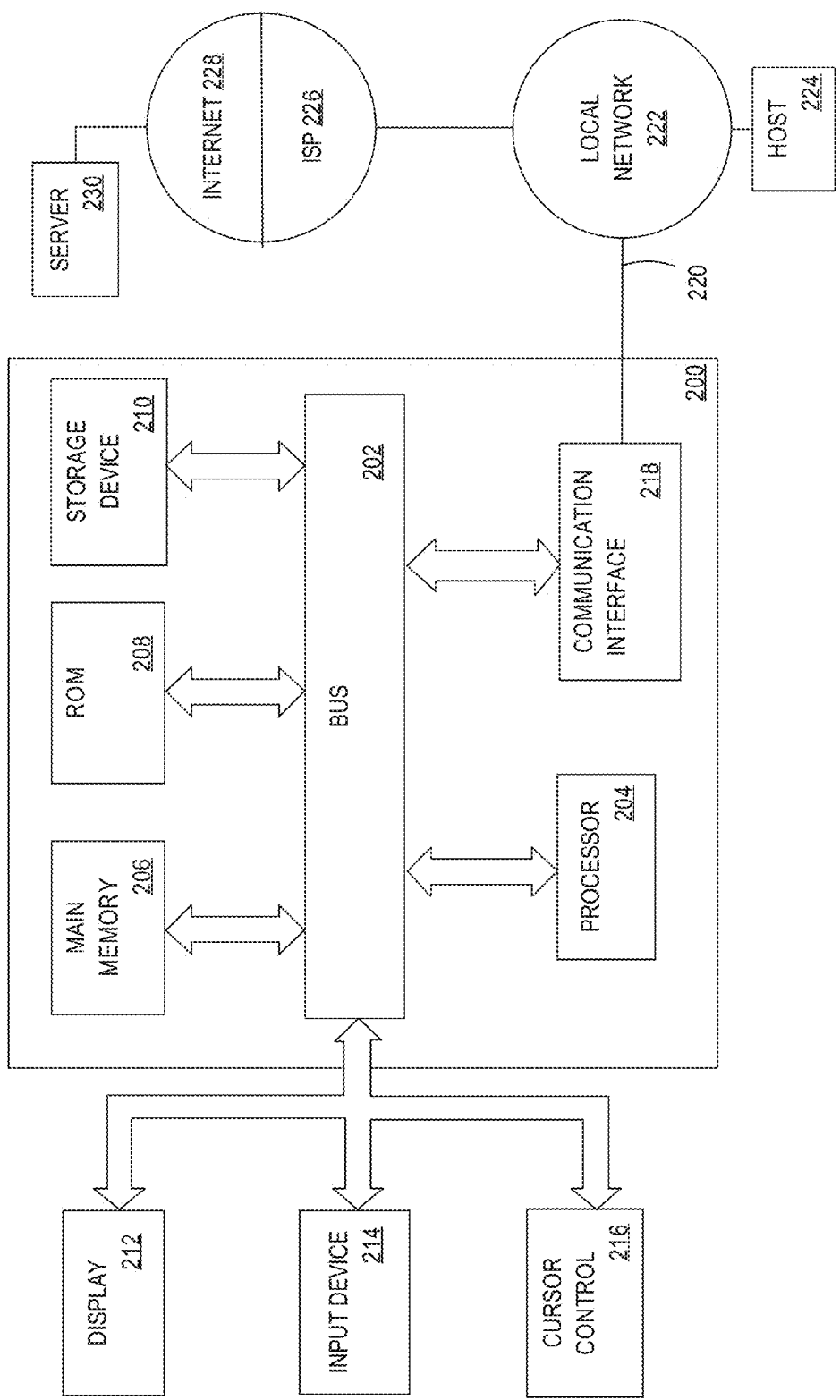
FIG. 2 is a block diagram illustrating an example computing device suitable for implementing embodiments of the present invention.

Referring now to FIG. 2, it is a block diagram that illustrates an example computing device 200. Computing device 200 and its components, including their connections, relationships, and functions, is meant to be exemplary only, and not meant to limit implementations of the present invention. Other computing devices suitable for implementing the present invention may have different components, including components with different connections, relationships, and functions.

Computing device 200 may include a bus 202 or other communication mechanism for addressing main memory 206 and for transferring data between and among the various components of device 200.

Computing device 200 may also include one or more hardware processors 204 coupled with bus 202 for processing information. A hardware processor 204 may be a general purpose microprocessor, a system on a chip (SoC), or other processor suitable for implementing the present invention.

Main memory 206, such as a random access memory (RAM) or other dynamic storage device, also may be coupled to bus 202 for storing information and instructions to be executed by processor(s) 204. Main memory 206 also may be used for storing temporary variables or other intermediate information during execution of software instructions to be executed by processor(s) 204. Such software instructions, when stored in non-transitory storage media accessible to processor(s) 204, render computing device 200 into a special-purpose computing device that is customized to perform the operations specified in the instructions. The terms "instructions", "software", "software instructions", "program", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, Javascript, web pages, web applications, plugins, embedded software, microcode, compilers, debuggers, interpreters, virtual machines, linkers, and text editors.

Computing device 200 also may include read only memory (ROM) 208 or other static storage device coupled to bus 202 for storing static information and instructions for processor(s) 204.

One or more mass storage devices 210 may be coupled to bus 202 for persistently storing information and instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 210 (e.g., the main hard disk for the device) stores a body of program and data for directing operation of the computing device, including an operating system, user application programs, driver and other support files, as well as other data files of all sorts.

Computing device 200 may be coupled via bus 202 to display 212, such as a liquid crystal display (LCD) or other electronic visual display, for displaying information to a computer user. In some configurations, a touch sensitive surface incorporating touch detection technology (e.g., resistive, capacitive, etc.) may be overlaid on display 212 to form a touch sensitive display for communicating touch gesture (e.g., finger or stylus) input to processor(s) 204.

An input device 214, including alphanumeric and other keys, may be coupled to bus 202 for communicating information and command selections to processor 204. In addition to or instead of alphanumeric and other keys, input device 214 may include one or more physical buttons or switches such as, for example, a power (on/off) button, a "home" button, volume control buttons, or the like.

Another type of user input device may be a cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

While in some configurations, such as the configuration depicted in FIG. 2, one or more of display 212, input device 214, and cursor control 216 are external components (i.e., peripheral devices) of computing device 200, one or more of display 212, input device 214, and cursor control 216 are integrated as part of the form factor of computing device 200 in other configurations.

Functions of the disclosed systems, methods, and modules may be performed by computing device 200 in response to processor(s) 204 executing one or more programs of software instructions contained in main memory 206. Such instructions may be read into main memory 206 from another storage medium, such as storage device(s) 210. Execution of the software program instructions contained in main memory 206 cause processor(s) 204 to perform the functions of the disclosed systems, methods, and modules.

While in some implementations, functions of the disclosed systems and methods are implemented entirely with software instructions, hard-wired or programmable circuitry of computing device 200 (e.g., an ASIC, a FPGA, or the like) may be used in place of or in combination with software instructions to perform the functions, according to the requirements of the particular implementation at hand.

The term "storage media" as used herein refers to any non-transitory media that store data and/or instructions that cause a computing device to operate in a specific fashion. Such storage media may comprise non-volatile media and/or volatile media. Non-volatile media includes, for example, optical disks, magnetic disks, or solid-state drives, such as storage device 210. Volatile media includes dynamic memory, such as main memory 206. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 202. Transmission media can also take the form of acoustic or light waves, such as those generated during radio-wave and infra-red data communications.

Various forms of media may be involved in carrying one or more sequences of one or more instructions to processor(s) 204 for execution. For example, the instructions may initially be carried on a magnetic disk or solid-state drive of a remote computer. The remote computer can load the instructions into its dynamic memory and send the instructions over a telephone line using a modem. A modem local to computing device 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor(s) 204 retrieves and executes the instructions. The instructions received by main memory 206 may optionally be stored on storage device(s) 210 either before or after execution by processor(s) 204.

Computing device 200 also may include one or more communication interface(s) 218 coupled to bus 202. A communication interface 218 provides a two-way data communication coupling to a wired or wireless network link 220 that is connected to a local network 222 (e.g., Ethernet network, Wireless Local Area Network, cellular phone network, Bluetooth wireless network, or the like). Communication interface 218 sends and receives electrical, electromagnetic, or optical signals that carry digital data streams representing various types of information. For example, communication interface 218 may be a wired network interface card, a wireless network interface card with an integrated radio antenna, or a modem (e.g., ISDN, DSL, or cable modem).

Network link(s) 220 typically provide data communication through one or more networks to other data devices. For example, a network link 220 may provide a connection through a local network 222 to a host computer 224 or to data equipment operated by an Internet Service Provider (ISP) 226. ISP 226 in turn provides data communication services through the world wide packet data communication network now commonly referred to as the "Internet" 228. Local network(s) 222 and Internet 228 use electrical, electromagnetic or optical signals that carry digital data streams. The signals through the various networks and the signals on network link(s) 220 and through communication interface(s) 218, which carry the digital data to and from computing device 200, are example forms of transmission media.

Computing device 200 can send messages and receive data, including program code, through the network(s), network link(s) 220 and communication interface(s) 218. In the Internet example, a server 230 might transmit a requested code for an application program through Internet 228, ISP 226, local network(s) 222 and communication interface(s) 218.

The received code may be executed by processor 204 as it is received, and/or stored in storage device 210, or other non-volatile storage for later execution.

Example Basic Software

Figure 3:
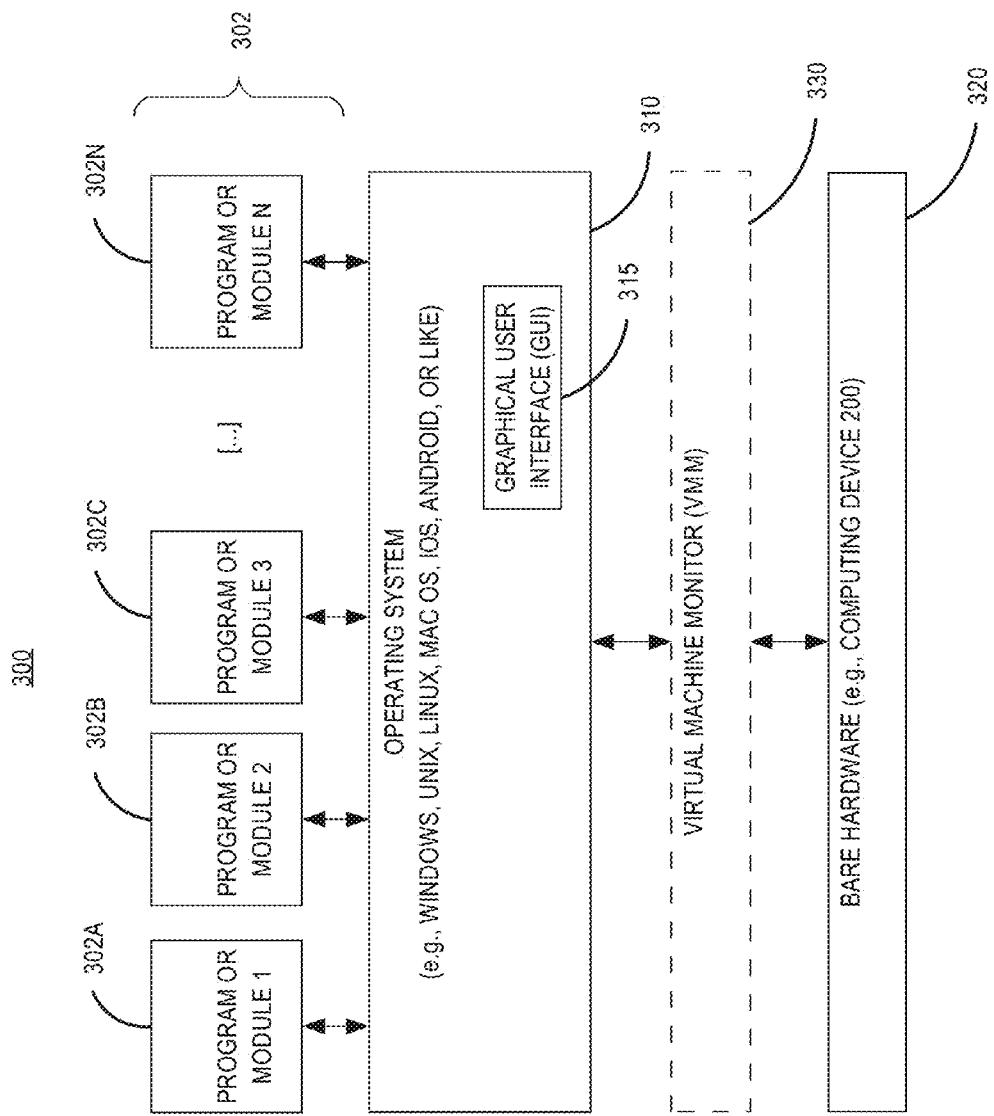
FIG. 3 is a block diagram illustrating an example software system that may be employed for controlling the operation of the computing device of FIG. 2.

FIG. 3 is a block diagram of an example software system 300 that may be employed for controlling the operation of computing device 200. As shown, a computer software system 300 is provided for directing the operation of computing device 200. Software system 300, which may be stored in system memory (RAM) 206 and on fixed storage (e.g., hard disk) 210, includes a kernel or operating system (OS) 310. The OS 310 manages low-level aspects of computer operation, including managing execution of processes, memory allocation, file input and output (I/O), and device I/O. One or more application programs (e.g., client application 112 of FIG. 1) or modules (e.g., 132, 134, 136, 138, 140, 142, and 144 of FIG. 1), represented as 302A, 302B, 302C . . . 302N in FIG. 3, may be "loaded" (i.e., transferred from fixed storage 310 into memory 306) for execution by the system 400. The applications or other software intended for use on device 300 may also be stored as a set of downloadable computer-executable instructions, for example, for downloading and installation from an Internet location (e.g., Web server).

Software system 300 may include a graphical user interface (GUI) 315, for receiving user commands and data in a graphical (e.g., "point-and-click" or "touch gesture") fashion. These inputs, in turn, may be acted upon by the system 300 in accordance with instructions from operating system 310 and/or client application module(s) 302. The GUI 315 also serves to display the results of operation from the OS 310 and application(s) 302, whereupon the user may supply additional inputs or terminate the session (e.g., log off).

OS 310 can execute directly on the bare hardware (e.g., processor(s) 204) 320 of device 200. Alternatively, a hypervisor or virtual machine monitor (VMM) 330 may be interposed between the bare hardware 320 and the OS 310. In this configuration, VMM 330 acts as a software "cushion" or virtualization layer between the OS 310 and the bare hardware 320 of the device 100.

VMM 330 instantiates and runs virtual machine instances ("guest machines"). Each guest machine comprises a "guest" operating system, such as OS 310, and one or more applications, such as applications 302, designed to execute on the guest operating system. The VMM 330 presents the guest operating systems with a virtual operating platform and manages the execution of the guest operating systems.

In some instances, the VMM 330 may allow a guest operating system to run as if it is running on the bare hardware 320 of device 200 directly. In these instances, the same version of the guest operating system configured to execute on the bare hardware 320 directly may also be able to execute on VMM 330 without modification or reconfiguration. In other words, VMM 330 may provide full hardware and CPU virtualization to a guest operating system in some instances.

In other instances, a guest operating system may be specially designed or configured to execute on VMM 330 for efficiency. In these instances, the guest operating system is "aware" that it executes on a virtual machine monitor. In other words, VMM 330 may provide para-virtualization to a guest operating system in some instances.

The above-described computer hardware and software is presented for purpose of illustrating example underlying computer components that may be employed for implementing the present invention. The present invention, however, is not necessarily limited to any particular computing environment or computing device configuration. Instead, the present invention may be implemented in any type of system architecture or processing environment capable of supporting the features and functions of the disclosed systems and methods.

Shared Workspaces and Selective Content Item Synchronization

Historically, existing cloud-based content management systems have been adequate at keeping personal content items in sync between a user's multiple devices. For example, with existing systems, user A could create or modify a document on a laptop device linked to the system and that update is automatically replicated through the system to user A's other linked devices such that all of the copies of the document at all of the linked devices are identical after the update is applied at all of the other linked devices as part of synchronization operations between the devices and the system.

In the business context, content items created by employees generally belong to the business and not the employees themselves. Further, businesses historically have viewed their content items as being centralized such as on a file server as opposed to being distributed among many personal computing devices. This centralized view made is easier for a business to segregate personal content items from content items belonging to the business. For example, an IT manager or administrator for a business could safely assume that all content items stored on the file server belong to the business. Further, owing to the centralized nature of the content items, it was easier for the business to control access to content items. For example, the IT manager or administrator can set access control permissions on content items stored on the company file server. Also, in many cases, the lifetime of content items belonging to the business exceeds the length of employment of any given employee. By storing content items belonging to it on a centralized file server, the business can provision access to content items to new employees simply by setting the appropriate access control permissions on the content items in the file server. Similarly, the business can revoke access to content items on the file server from departing employees simply by changing the access control permissions to revoke access. From the perspective of the business, the file server is viewed as the centralized repository for the business's content items that exist over time as employees come and go.

With some existing cloud-based content management systems, the content item storage model is less centralized than the traditional file server model. In particular, with these systems, each user of the system has their own individual synchronization repository on their personal computing device where content items synchronized with the system are stored. Further, each user maintains their individual synchronization repository independently of each other. For example, with existing systems, user Alice's synchronization repository may not provide any inherent visibility into user Bob's synchronization repository. In particular, user Alice may not know what content items are stored in user Bob's synchronization repository, and vice versa. Some existing systems provide mechanisms to share selected content items between synchronization repositories. For example, with some existing systems, user Alice can share a folder in her synchronization repository with user Bob such that updates Bob makes to the shared folder in his synchronization repository are seen by Alice in her synchronization repository, and vice versa. However, with existing systems, ownership of the shared folder is tied to an individual. This is problematic if Alice leaves the company and decommissions her synchronization repository or simply deletes the shared folder from her synchronization repository. In this case, the folder she shared with Bob may no longer be accessible to Bob. In the worst case, all of the work accumulated in the shared folder is lost.

Another problem with shared folders on existing systems is that hierarchical information pertaining to the shared folder may be lost when the shared folder is incorporated into another's synchronization repository. For example, assume Alice has a folder in her synchronization repository with the path /A/B/C. With existing systems, if user Alice shares folder /A/B/C with user Bob, the folder appears as /C in Bob's synchronization repository with the hierarchical information about parent folders "A" and "B" lost. This is problematic, especially if the names of the parent folders convey information about what is stored in the shared folder. Overall, existing cloud-based content management systems, due to the individualized and distributed nature of synchronization repositories, increase coordination costs for a business when used for managing and storing content items belonging to the business.

According to some embodiments, cloud system 108 and client application 112 provides shared workspaces 114 to users of clients 102-104. At the highest level, a shared workspace is a named collection of content items arranged according to a content item folder hierarchy with access controls that control access to content items in the shared workspace by users.

According to some embodiments, only a subset of the content items in a shared workspace are stored at a client 102 at any given time.

According to some embodiments, the user can browse the content item folder hierarchy of the shared workspace at a client 102 using a file system browser provided by an operating system of the client 102 (e.g., the finder on MAC OS devices or the WINDOWS EXPLORER on WINDOWS devices).

According to some embodiments, after a client 102 is joined to a shared workspace, an actionable icon appears in the GUI 110 at the client 102. For example, the icon may appear on the desktop of the GUI 110 provided by an operating system on the client 102. The user may interact with the icon (e.g., double-click on the icon) to open a file explorer like-view of the content item hierarchy of the shared workspace. Further, an icon or other indication of the shared workspace may also be displayed with other shared resources in an interface provided by the operating system on the client 102. For example, an actionable icon or text may be listed in the GUI 110 along with mounted drives, shared drives, network drives, or other connected resources. By doing so, the user can access the shared workspace from a familiar location where the user knows to access other connected resources such as mounted drives, external disks, and network drives.

According to some embodiments of the present invention, a shared workspace, as specified by shared workspace metadata in shared workspace metadata database 128, encompasses all of the following, or a subset or a superset thereof:

One or more content items stored in storage services 122-124;

A shared workspace content item hierarchy which specifies shared workspace paths to the content items contained in the shared workspace and specifies shared workspace paths to any empty content item folders contained in the shared workspace; and Access control lists on content items and content item folders contained in the shared workspace.

According to some embodiments of the present invention, when a user joins a client 102 to a shared workspace 114, only shared workspace metadata 116 for the shared workspace 114 is automatically downloaded from cloud system 108 and stored at the client 102. However, all of the content items contained in the shared workspace 114 are not automatically downloaded, at least not in response to joining the client 102 to the shared workspace 114. By doing so, the user can join the client 102 to the shared workspace 114 more quickly because at least some of the content items in the shared workspace 114 are not downloaded to the client 102 over the communications network 106 from the content item server 118. Further, this allows the user to join the client 102 to the shared workspace 114 even if the amount of available storage space at the client 102 is less than the amount that would be needed to store most or all of the content items that belong to the shared workspace 114. Also, at the same, the client 102 obtains from the cloud system 108 shared workspace metadata 116 that can be used by the client application 112 at the client 112 to provide a representation of the shared workspace 114 in a GUI 110 presented at the client 102. In some embodiments, the GUI 110 that is presented includes a user browse-able and interactive representation of the content item hierarchy of the shared workspace 114.

Figure 4A:
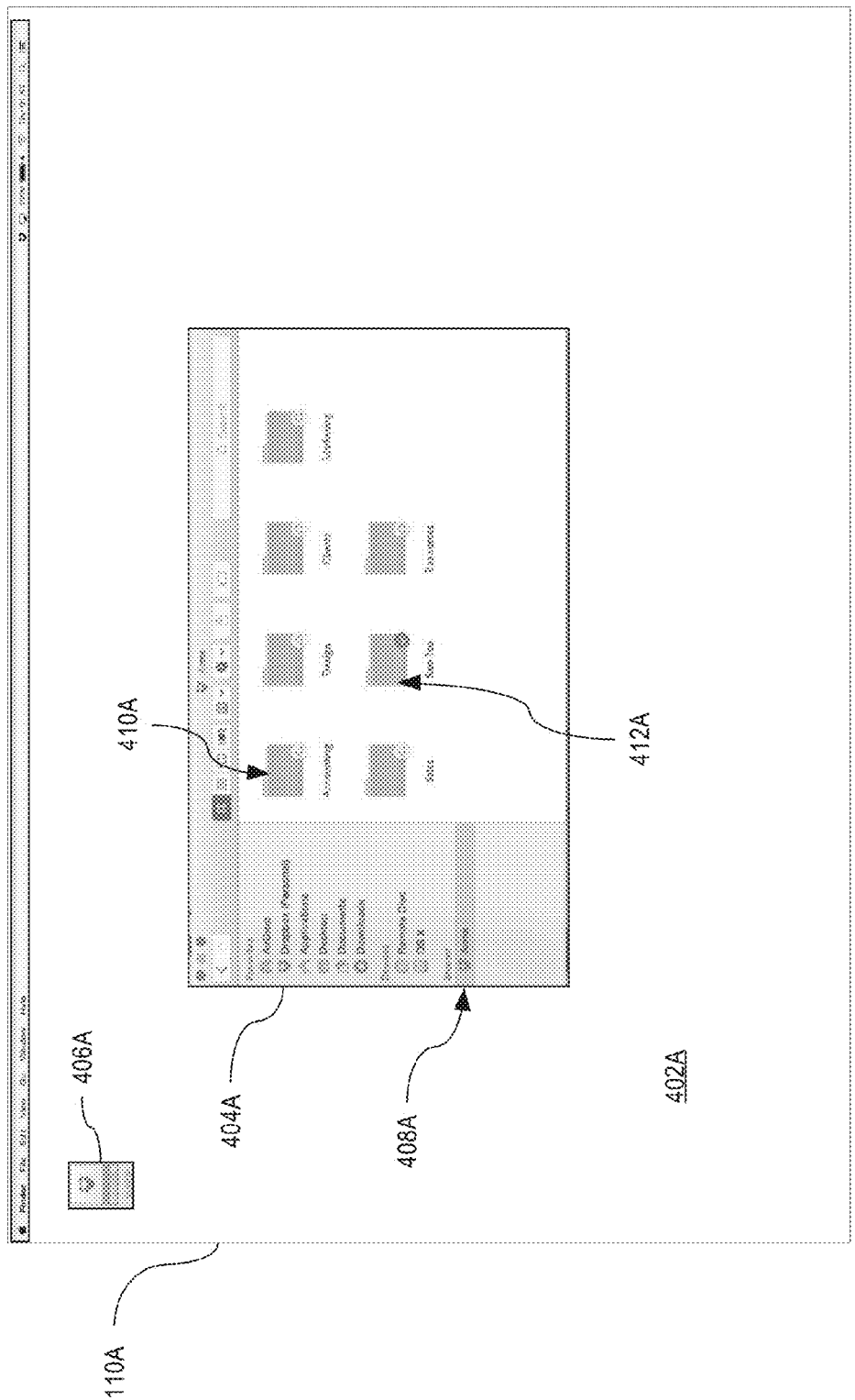
FIG. 4A depicts a graphical user interface in accordance with an embodiment of the invention.

FIG. 4A depicts an example GUI 110A presented at client 102 after the client 102 has been successfully joined to a shared namespace 114 named "Acme". The GUI 110A includes a desktop 402A, a content item browser 404A, and a shared workspace launcher icon 406A. The desktop 402A may be presented by an operating system (e.g., 310) of the client 102. The content item browser 404A and the shared workspace launcher icon 406A may be presented by a combination of the operating system and the client application 112.

According to some embodiments, when a client 102 has joined a shared workspace, the shared workspace 114 on the client 102 appears as a mounted drive, disk, or device or a shared resource in a file system browser provided by an operating system of the client 102. For example, the "Acme" shared workspace 114 appears in content item browser 404A as a shared resource 408A, which is currently selected, as indicated with highlighting. By doing this, integration of the shared workspace 114 into the desktop 402A environment is more seamless based on the user's prior familiarity with the file system browser. If the user has joined the client 102 to more than one shared workspace 114, then multiple shared workspaces may appear as a shared resource (like shared resource 408A for the "Acme" shared workspace 114) in the file system browser 404A.

As mentioned, according to some embodiments, when a client 102 is joined to a shared workspace 114, all of the content items belonging to the shared workspace 114 may not be automatically download from the content item server 118 to the client 102. However, shared workspace metadata 116 for the shared workspace 114 may be automatically downloaded from the control server 120 to the client 102. By doing so, the client application 112 can provide a representation of the shared workspace 114 in the GUI 110 presented at the client 102.

For example, content item browser 404A includes a plurality of folder icons. Each folder icon (e.g., 410A) represents a content item folder at the root of, or contained in another content item folder of, the content item hierarchy of the "Acme" shared workspace 114. Each folder icon (e.g., 410A) includes a synchronization configuration status icon which indicates a current synchronization configuration with respect to the corresponding content item folder.

According to some embodiments, there are at least two different synchronization configuration status icons corresponding to two different synchronization configurations. One configuration status icon represents that the contents of the content item folder are currently configured for cloud-access only. That is, the contents of the content item folder is not stored locally at the client 102. In the example of FIG. 4A, the synchronization configuration status icon that represents this configuration has the appearance of a cloud. For example, a cloud icon appears in conjunction with the "Accounting" content item folder 410A to indicate that the contents of that content item folder are not stored locally at the client 102. Another configuration status icon represents that the contents of the content item folder are currently available for offline access. That is, the contents of the content item folder is stored locally at the client 102. In the example of FIG. 4A, the icon representing this configuration has the appearance of a checkmark. For example, a checkmark appears in conjunction with the "Sam Jau" content item folder 412A to indicate that the contents of that folder are stored locally at the client 102 and thus available for access even when the client 102 is not connected to communication network 106.

By viewing the synchronization configuration status icons, the user can quickly discern whether the contents of a corresponding content item folder is available for offline access at the client 102. The same or similar icons may also be used to represent the current synchronization configuration status of a content item, as opposed to a content item folder.

In some embodiments, the current synchronization configuration status of a content item folder or a content item in a shared workspace 114 is stored as part of the shared workspace metadata 116 for the shared workspace 114 at the client 102. According to some embodiments, the user may interact with the GUI 110 at the client 102 to change the current synchronization configuration status of a selected content item folder or a selected content item. According to some embodiments, if the synchronization configuration status for a content item folder or a content item is changed from cloud-access to offline-access, then the client application 112 downloads the content item folder or the content item from the content item server 118 to the client 102 in response to detecting the change. Thereafter, so long as the synchronization configuration status for the content item folder or the content item remains offline-access, the client application 112 will keep the content item folder or the content item in sync with the current version of the content item folder or the content item in the cloud system 108. Such synchronization between the client 102 and the cloud system 108 may occur asynchronously or periodically, however. Therefore, there may be brief periods of time between synchronization operations in which the content item folder or the content item at the client 108 is out-of-sync with respect to the current content item folder or the content item at the cloud system 108 despite the content item folder or the content item being configured at the client 102 for offline-access.

Figure 4B:
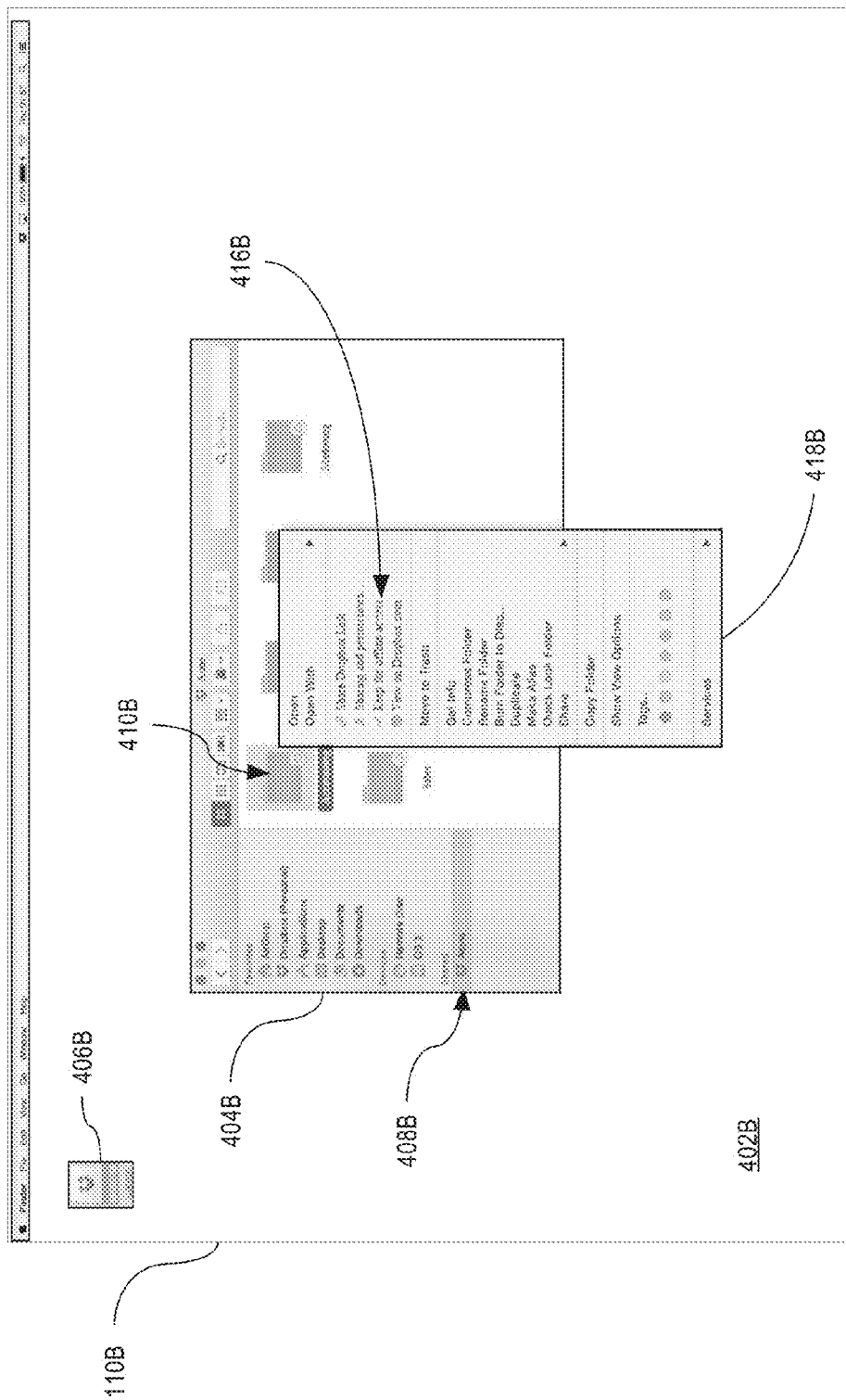
FIG. 4B depicts a graphical user interface in accordance with an embodiment of the invention.

For example, in FIG. 4B, the user has right-clicked on the "Accounting" folder icon 410B. In response a pop-up menu 418B is displayed in GUI 110B. The menu 418B provides the option 416B to change the current synchronization configuration status for the "Accounting" content item folder from cloud-access to offline-access.

Figure 4C:
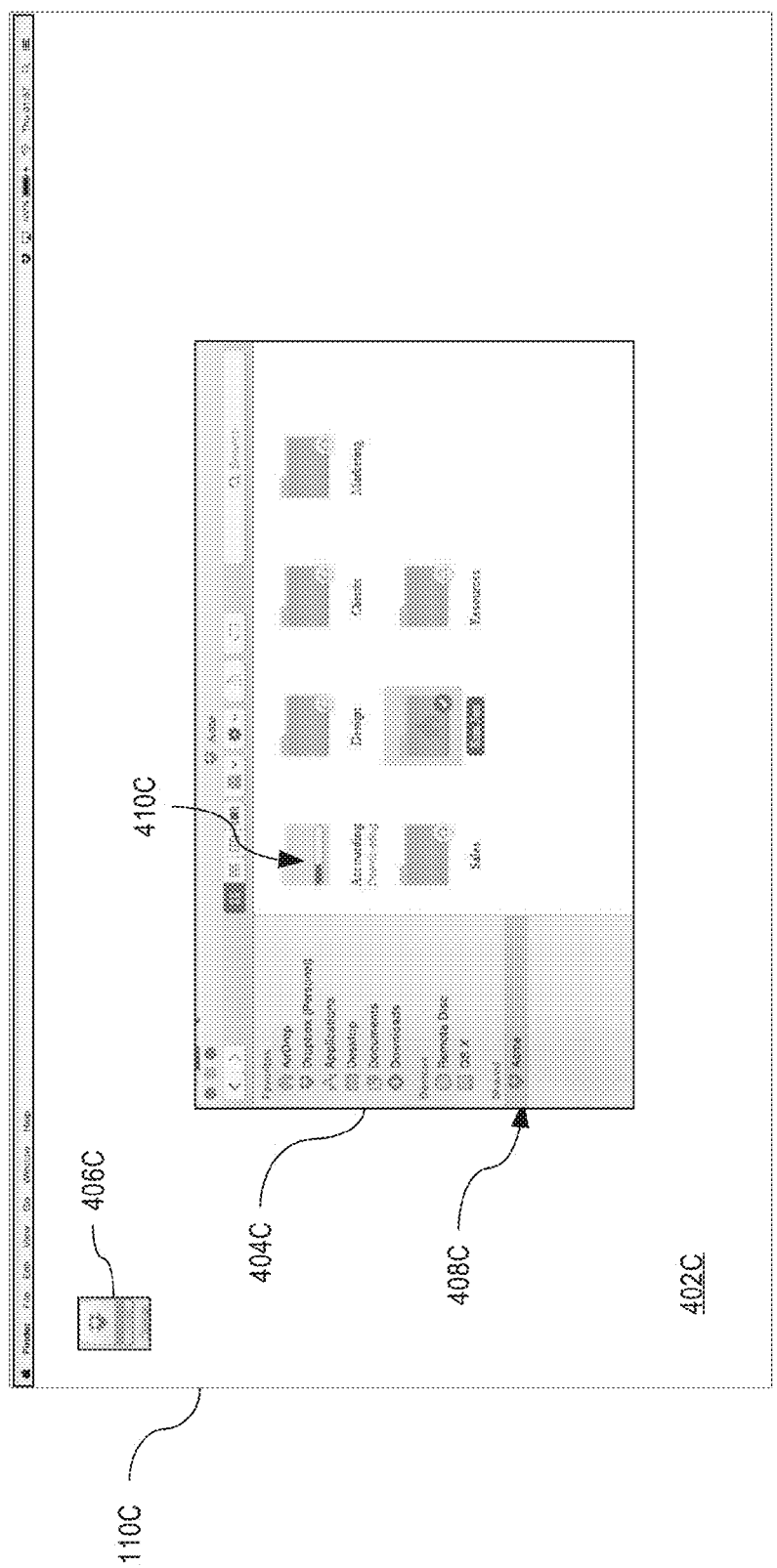
FIG. 4C depicts a graphical user interface in accordance with an embodiment of the invention.
Figure 4D:
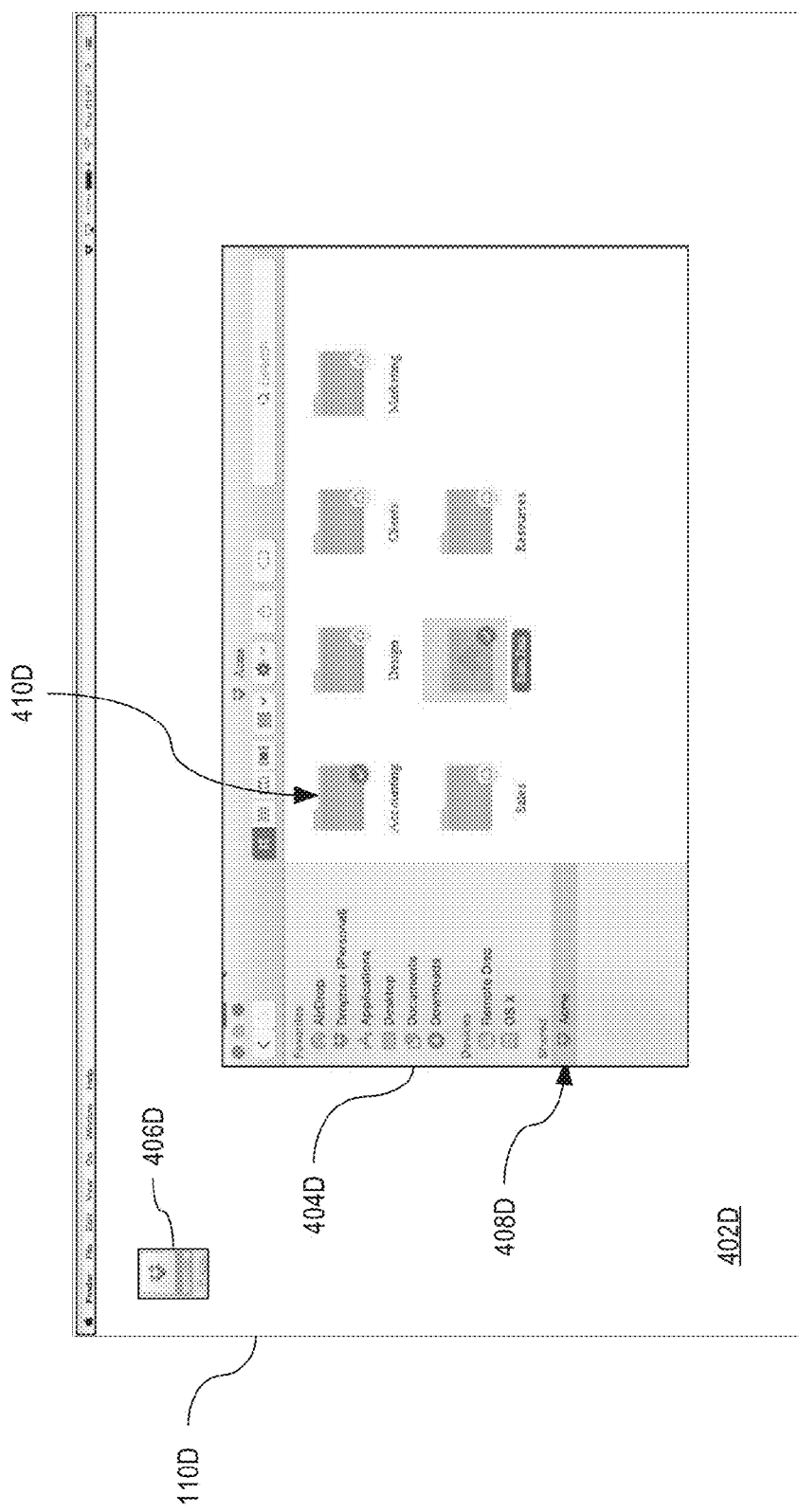
FIG. 4D depicts a graphical user interface in accordance with an embodiment of the invention.

In response to selecting option 416B, the contents of the "Accounting" content item folder are downloaded to the client 102 from content item server 118 as shown 410C in FIG. 4C. After the contents of the "Accounting" content item folder has finished downloading to the client 102, the synchronization configuration status icon changes to indicate that the contents are now available for offline access. For example FIG. 4D shows the folder icon 410D now with a checkmark to indicate that the contents of the "Accounting" content item folder is now configured for offline-access.

According to some embodiments, content items in the shared workspace can also be configured for cloud-access or offline-access. If a content item is configured for cloud-access and the user opens the content item, then the content item may be downloaded automatically to the client 102 before it is opened at the client 102. Thereafter, the content item may be configured for offline-access and that configuration indicated as such in the GUI 110 (e.g., with a checkmark). In other words, the user's request to open the content item locally at the client 102 may be interpreted as a request to change the synchronization configuration from cloud-access to offline-access. In some embodiments, the synchronization configuration status is only changed if the user takes some other action in addition to opening the content item. For example, the synchronization configuration status may be automatically changed from cloud-access to offline-access if the user both opens the content item and edits the content item or opens the content item multiple times within a threshold period of time (e.g., 24 hours). In the case where the synchronization configuration status is not changed from cloud-access to offline-access when the user merely opens the content item, the content item is still downloaded to the client 102 and may be cached at the client 102 for some time in anticipation of possible subsequent access by the user. However, the synchronization configuration status icon of the content item in the GUI 110 may continue to indicate cloud-access (e.g., with a cloud icon).

According to some embodiments, the client application 112 detects when the amount of local storage space (e.g., hard disk space) at the client 102 occupied by content items in a shared workspace that are configured for offline-access exceeds a threshold or a threshold percentage. In response to exceeding the threshold, the client application 112 may prompt the user to change the synchronization configuration status of one or more content items that are currently configured for offline-access to cloud-access. At the same time, the client application 112 may delete the content item at the client 102 so as to free up storage resources.

When a user makes a local change to a content item in the shared workspace at the client 102, the client application 112 automatically replicates the change to the cloud system 108 for application to the copy of the content item stored in storage servers 122-124.

According to some embodiments, when a user opens a content item folder configured for cloud-access, the content item folder is opened but the contents of the content item folder are not automatically downloaded from the cloud system 108 as with opened content items. Further, unlike with opened content items, the synchronization configuration status of the opened content item folder remains as cloud-access.

According to some embodiments, one or more content item folders in a shared workspace are preconfigured for offline-access. As a result, upon joining the shared workspace, the contents of these content item folders are automatically downloaded to the client 102.

According to some embodiments, the user at the client 102 can view the access controls set on a content item folder or a content item in the GUI 110. For example, the user may right-click on an icon representing a content item folder or a content item displayed in the GUI 110 may cause a pop-up menu to be displayed. From the pop-up menu the user may select an option that displays the current access control set on the corresponding content item folder or content item.

According to some embodiments, the icon representing a content item folder or a content item of a shared workspace displayed in the GUI 110 indicates who has access to the content item folder or the content item. For example, one icon may indicate that a subset of a set of users has access to the content item folder or the content item and another icon may indicate that at least one user not in the set of users has access to the content item folder or the content item. By doing so, the user can quickly obtain by viewing the icon represented the folder or the content item whether access to the content item folder or the content item is restricted to a subset of the set of users or is accessible outside the set of users.

According to another embodiment, the icon that represents a content item folder or a content item can convey one of the three states with respect to who has access to the content item folder or the content item according to the access controls set on the content item folder or the content item. One icon state conveys that a subset of a set of users has access to the content item folder or the content item, a second icon state conveys that at least one user not in the set of users has access to the content item folder or the content item, and a third state conveys that exactly the set of users has access to the content item folder or the content item. The set of users may be, for example, the set of users that have been invited to join the shared workspace or the set of users that have joined at least one device to the shared workspace.

According to some embodiments, storage space permitting at the client 102, the client application 112 will automatically download (pre-fetch) a content item in a shared workspace from the cloud system 108 to the client 112 in expectation that the content item will soon be accessed at the client 102. The client application 112 may do this even when the content item is configured for cloud-access. Some of the reasons the client application 112 may pre-fetch a content item is because the content item or a related content item has recently been modified at another client 104. In this case, the notification module 144, upon detecting the modification to the content item or the related content item, may signal the client application 112 at the client 102 to download the content item (or a portion thereof) from the content item server 118 to the client 102. In this case, the icon displayed in the GUI 110 for the content item may remain as cloud-access in case the content item is subsequently removed from the content item cache at the client 102.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

The invention claimed is:

1. A method for providing shared content item workspaces with selective content item synchronization, the method comprising:

at a personal computing device comprising one or more processors and storage media storing one or more computer programs executed by the one or more processors to perform the method, performing operations comprising:

upon the personal computing device joining a shared workspace accessible by a user account held with a content management system, downloading metadata to the personal computing device from a control server of the content management system, the metadata pertaining to the shared workspace, the shared workspace associated with a first one or more content items and associated with a second plurality of content items, the metadata specifying that the first one or more content items are configured for offline access and specifying that the second plurality of content items are configured for cloud access;

upon the personal computing device joining the shared workspace, downloading one or more content item blocks of the first one or more content items configured for offline access to the personal computing device from a content item server associated with the content management system;

responsive to an activation of an actionable shared workspace launcher icon for the shared workspace, displaying, within a file system browser window provided by an operating system of the personal computing device, a corresponding actionable file system browser icon for each of the first one or more content items and for each of the second plurality of content items, the corresponding actionable file system browser icon for each of the first one or more content items visibly indicating that the content item is configured for offline access, the corresponding actionable file system browser icon for each of the second plurality of content items visibly indicating that the content item is configured for cloud access;

responsive to an activation of the corresponding actionable file system browser icon for a particular content item of the second plurality of content items, the activation to open the particular content item: (a) downloading one or more content item blocks of the particular content item from a content item server associated with the content management system, (b) storing the one or more content item blocks of the particular content item at the personal computing device, and (c) updating display of the corresponding actionable file system browser icon for the particular content item to visibly indicate that the particular content item is no longer configured for cloud access at the personal computing device and to visibly indicate that the particular content item is currently configured for offline access at the personal computing device;

responsive to determining that an amount of a local storage space at the personal computing device occupied by content items in the shared workspace that are configured for offline access exceeds a threshold, prompting a user of the personal computing device to configure one or more of the content items in the shared workspace for cloud access;

responsive to the user configuring one or more of the content items in the shared workspace for cloud access, removing the one or more content items the user configured for cloud access from the local storage space at the personal computing device; and updating display of a corresponding actionable file system browser icon for each the one or more content items removed.

2. The method of claim 1, wherein:
the metadata further comprises one or more identifiers of the one or more content item blocks of the first one or more content items configured for offline access; and
the operation of downloading the one or more content item blocks of the first one or more content items configured for offline access from the content item server comprises the operation of providing the one or more identifiers of the one or more content item blocks of the first one or more content items configured for offline access in a network request of the content item server.

3. The method of claim 1, wherein:
each of the second plurality of content items is a content item folder or a content item file; and
the operation of displaying, within the file system browser window, a corresponding actionable file system browser icon for each of the second plurality of content items comprises the operation of displaying, within the file system browser window, a corresponding actionable file system browser icon for each of the second plurality of content items indicating whether the content item is a content item folder or a content item file.

4. The method of claim 1, wherein:
the particular content item is a particular content item folder;
the one or more content item blocks of the particular content item belong to one or more content item files contained in the particular content item folder; and
the metadata indicates the one or more content item files contained in the particular content item folder.

5. The method of claim 1, wherein:
the activation of the actionable file system browser icon corresponding to the particular content item is a first activation of the actionable file system browser icon corresponding to the particular content item; and
responsive to a second activation of the actionable file system browser icon corresponding to the particular content item, deleting the one or more content item blocks of the particular content item from the personal computing device, and updating display of the corresponding actionable file system browser icon for the particular content item to indicate that the content item is currently configured for cloud access at the personal computing device.

6. The method of claim 1, further comprising:
while the operation of downloading the one or more content item blocks of the particular content item from the content item server is being performed, updating display of the corresponding actionable file system browser icon for the particular content item to indicate that the downloading is currently being performed.

7. The method of claim 1, wherein the joining the personal computing device to the shared workspace is based, at least in part, on: installation of a client application of the content management system on the personal computing device, and successful authentication against the user account held with the content management system based on credentials provided from the personal computing device after the client application is installed on the personal computing device.

8. The method of claim 7, wherein the downloading the one or more content item blocks of the particular content item from a content item server associated with the content management system is performed by the client application installed on the personal computing device.

9. A personal computing device comprising:
one or more processors; and
storage media storing one or more computer programs for execution by the one or more processors, one or more computer programs comprising instructions for:
upon the personal computing device joining a shared workspace accessible by a user account held with a content management system, downloading metadata to the personal computing device from a control server of the content management system, the metadata pertaining to the shared workspace, the shared workspace associated with a first one or more content items and associated with a second plurality of content items, the metadata specifying that the first one or more content items are configured for offline access and specifying that the second plurality of content items are configured for cloud access;
upon the personal computing device joining the shared workspace, downloading one or more content item blocks of the first one or more content items configured for offline access to the personal computing device from a content item server associated with the content management system;
responsive to an activation of an actionable shared workspace launcher icon for the shared workspace, displaying, within a file system browser window provided by an operating system of the personal computing device, a corresponding actionable file system browser icon for each of the first one or more content items and for each of the second plurality of content items, the corresponding actionable file system browser icon for each of the first one or more content items visibly indicating that the content item is configured for offline access, the corresponding actionable file system browser icon for each of the second plurality of content items visibly indicating that the content item is configured for cloud access;

responsive to an activation of the corresponding actionable file system browser icon for a particular content item of the second plurality of content items, the activation to open the particular content item: (a) downloading one or more content item blocks of the particular content item from a content item server associated with the content management system, (b) storing the one or more content item blocks of the particular content item at the personal computing device, and (c) updating display of the corresponding actionable file system browser icon for the particular content item to visibly indicate that the particular content item is no longer configured for cloud access at the personal computing device and to visibly indicate that the particular content item is currently configured for offline access at the personal computing device;

responsive to determining that an amount of a local storage space at the personal computing device occupied by content items in the shared workspace that are configured for offline access exceeds a threshold, prompting a user of the personal computing device to configure one or more of the content items in the shared workspace for cloud access;

responsive to the user configuring one or more of the content items in the shared workspace for cloud access, removing the one or more content items the user configured for cloud access from the local storage space at the personal computing device; and updating display of a corresponding actionable file system browser icon for each the one or more content items removed.

10. The device of claim 9, wherein:

the metadata further comprises one or more identifiers of the one or more content item blocks of the first one or more content items configured for offline access; and the operation of downloading the one or more content item blocks of the first one or more content items configured for offline access from the content item server comprises the operation of providing the one or more identifiers of the one or more content item blocks of the first one or more content items configured for offline access in a network request of the content item server.

11. The device of claim 9, wherein:

each of the second plurality of content items is a content item folder or a content item file; and the operation of displaying, within the file system browser window, a corresponding actionable file system browser icon for each of the second plurality of content items comprises the operation of displaying, within the file system browser window, a corresponding actionable file system browser icon for each of the second plurality of content items indicating whether the content item is a content item folder or a content item file.

12. The device of claim 9, wherein:

the particular content item is a particular content item folder;

the one or more content item blocks of the particular content item belong to one or more content item files contained in the particular content item folder; and the metadata indicates the one or more content item files contained in the particular content item folder.

13. The device of claim 9, wherein:

the activation of the actionable file system browser icon corresponding to the particular content item is a first activation of the actionable file system browser icon corresponding to the particular content item; and responsive to a second activation of the actionable file system browser icon corresponding to the particular content item, deleting the one or more content item blocks of the particular content item from the personal computing device, and updating display of the corresponding actionable file system browser icon for the particular content item to indicate that the content item is currently configured for cloud access at the personal computing device.

14. The device of claim 9, the one or more computer programs further comprising instructions for:

while downloading the one or more content item blocks of the particular content item from the content item server, updating display of the corresponding actionable file system browser icon for the particular content item to indicate that the downloading is currently being performed.

15. The device of claim 9, wherein the joining the personal computing device to the shared workspace is based, at least in part, on: installation of a client application of the content management system on the personal computing device, and successful authentication against the user account held with the content management system based on credentials provided from the personal computing device after the client application is installed on the personal computing device.

16. The device of claim 15, wherein client application installed on the personal computing device comprises the instructions configured for the downloading the one or more content item blocks of the particular content item from a content item server associated with the content management system.

\* \* \* \* \*